March 11, 1952     J. A. PHILLIPS     2,589,026
FLAP OPERATING MEANS
Filed May 10, 1946

*INVENTOR.*
JOSEPH A. PHILLIPS
BY *Richard W. Treverton*
ATTORNEY

Patented Mar. 11, 1952

2,589,026

UNITED STATES PATENT OFFICE 2,589,026

FLAP OPERATING MEANS

Joseph A. Phillips, Wichita, Kans., assignor to Curtiss-Wright Corporation, a corporation of Delaware Application May 10, 1946, Serial No. 668,922

6 Claims. (Cl. 244—42)

This invention relates to means for operating retractable aircraft wing flaps and the like, and particularly to a mechanism for mounting the flap upon the aircraft and for controlling its movement between retracted and extended positions.

An object of the invention is a mechanism which may mount the flap adjacent the trailing edge of the wing or other airfoil in a manner not to interfere with installation and operation of an aileron, elevon or other control surface which may also be provided at the trailing edge of the airfoil.

According to the invention the flap is supported by means which allow it to be moved linearly from a retracted position, in which it is preferably nested in the airfoil, to an extended position wherein it is spaced substantially in a vertical direction and in a longitudinal direction from its retracted position; the supporting means causing the flap to remain substantially parallel to the airfoil during the beginning phases of extension and to assume a rapidly increasing angular relation to the airfoil in the terminal phases of extension.

The results, which are effected by a simple linkage arrangement, are to produce a minimum of disruption of air flow around the airfoil and its aileron or other control surface while the flap is being extended and retracted; and, in the preferred embodiment of the invention, to dispose the extended flap in such remote relation to the control surface as not to unduly interfere with the normal control functions of the latter.

The foregoing and other objects and advantages of the invention will become apparent from the following description of the preferred embodiment shown in the accompanying drawing, wherein.

Figure 1:
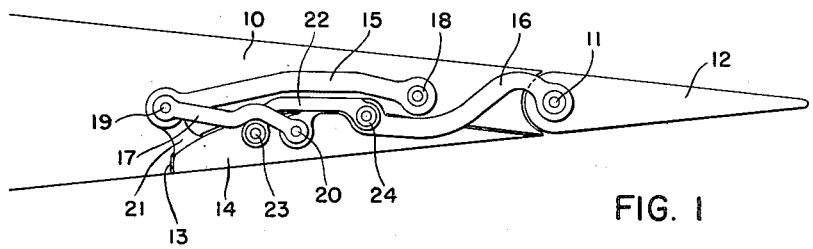
Fig. 1 is a side elevational view of flap operating mechanism applied to the trailing edge of an airfoil, with the flap in fully retracted position.

As shown in the drawings, the wing or other airfoil 10 of an aircraft may have hinged thereto at 11 along its trailing edge an aileron, elevon, or like auxiliary airfoil 12. Formed in the lower surface of airfoil 10 is a recess 13 for receiving in nested relation a flap 14, the latter being supported by a linkage comprising arms 15 and 16, and links 17 and 22. The forward arm, 15, is carried by a torque shaft 18 journalled in the airfoil 10, and is pivoted at 19 to a horn 21 extending upwardly from the leading edge portion of the flap. The link 17 is also pivoted at 19 to the forward arm and to the flap horn, and the rearward arm 16 is pivoted at 20 to link 17 and at 11 to airfoil 10.

The arms 15 and 16 and the link 17 together with the wing structure between the pivots 11 and 18, form a four-bar linkage, the form of which is approximately, but preferably not exactly, a parallelogram. As shown in the drawing, the effective length of arm 16 between pivots 11, 20 is preferably slightly longer than the length of arm 15 between pivots 18, 19 so that while the distance between pivots 11, 18 is substantially equal to the effective length of link 17 between pivots 19, 20, the arms 15, 16 are caused to move in unison but through somewhat unequal arcs. The link 22 is pivoted at 23 to the flap 14, and to the arm 16 at point 24 which is between pivots 11 and 20.

Figure 3:
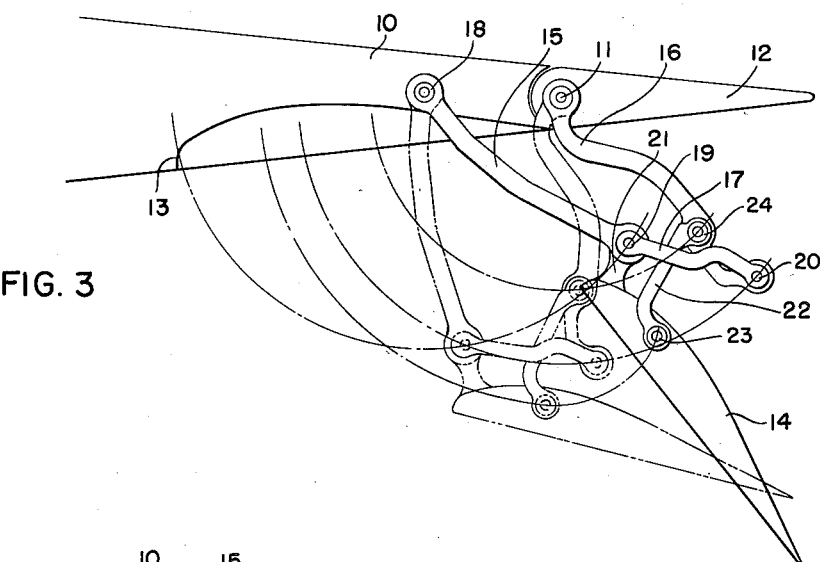
Figure 2:
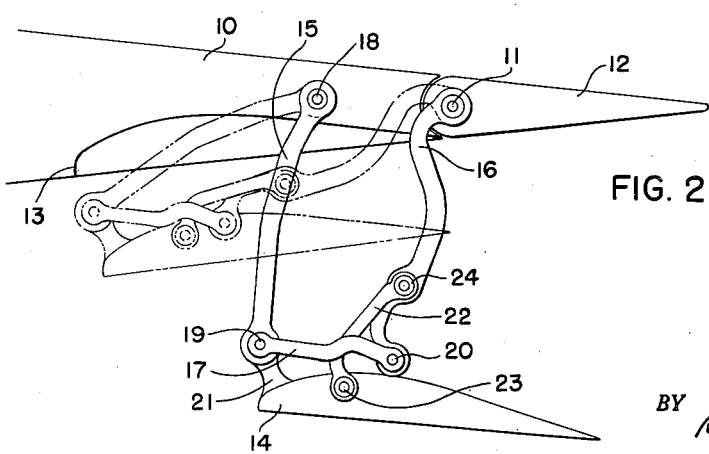
Fig. 2 is a similar view showing the flap in two successive intermediate positions of extension indicated in broken lines and full lines, respectively; and, Fig. 3 is a similar view showing in broken lines the flap in a more advanced intermediate position of extension and in full lines the completely extended position of the flap.

In lowering the flap, the torque shaft is rotated in a counterclockwise direction by suitable operating means (not shown) to swing the arms 15 and 16 downwardly and rearwardly from the position thereof shown in Fig. 1 through the successive positions shown in broken lines and in full lines in Fig. 2. Continued counterclockwise motion will result in continued rearward swinging motion of the arms, which will be in an upward direction between the succesive positions shown in broken lines and in full lines in Fig. 3. The leading edge of the flap will have a similar motion, while the trailing edge of the flap will be lowered with respect to the leading edge at an accelerating rate during such motion due to the angle between pivot points 20, 24, 23 becoming wider as the terminal position shown in full lines in Fig. 3 is approached.

It will be seen that the linkage shown and described allows the flap to be disposed forwardly of the aileron 12 in the retracted position thereof and to be disposed rearwardly of the aileron hinge axis 11 in the fully extended position thereof. In the latter position, the flap is spaced below the aileron 12 sufficiently to allow effective control action of the aileron.

During initial extending and terminal retracting motions the flap is held substantially parallel with the airfoil 10 (see broken line position of Fig. 2) since its angular movement about its transverse axis is at a rate, relative to its rate of linear movement, which progressively increases and decreases, respectively, as it extends and retracts. As a result, at times when the flap is adjacent the lower surface of the airfoil and in advance of the aileron, a minimum of aerodynamic disturbance of the airstream under the aileron is created. The major portion of the angular movement of the flap occurs when it is widely spaced from the airfoil 10, so that the zone in which normal airflow is disturbed by downward inclination of the flap is to the rear of the airfoil 10 and aileron 12, with the result that the latter loses little of its efficiency as a control element.

As used in the claims, by "axis" of a link is meant the straight line joining the pivot connections at the ends of the link.

The linkage shown and described consists of few parts, is efficient in operation and permits the use of a flap in an area of an airplane wing that includes an aileron without disrupting the function of the aileron or unduly complicating mounting of the aileron or its controls upon the wing. It will be understood that the single linkage system shown may be duplicated at sufficient points along the span of the flap to afford the necessary support therefor. It will also be understood that the structure specifically shown and described is merely illustrative of a preferred embodiment of the inventive principles involved, and that these principles may be otherwise utilized without departing from the spirit of the invention or the scope of the appended claims.

I claim:

1. In combination with an airfoil having a recess in the under surface thereof, a flap adapted to nest in said recess in the retracted position thereof, a forward arm pivoted to the airfoil and to the flap, a rearward arm pivoted at one end to the airfoil, a link connecting the outer ends of said arms and forming with said arms and the airfoil a four-bar linkage causing said arms to move angularly in unison, and a second link pivotally connected to the rearward arm intermediate the ends thereof and pivotally connected to the flap rearwardly of the pivotal connection of the forward arm to the flap with the pivotal connection of said second link to the flap being disposed forwardly of the pivotal connection of said first link to said rearward arm at least in the retracted position of said flap, said arms and second link being arranged to carry the flap between said retracted position thereof and an extended position disposed substantially beneath and spaced from said airfoil, to maintain the flap substantially parallel with the airfoil as it approaches and departs from said retracted position, and to turn the flap about its transverse axis at an accelerating rate with respect to said angular movement of the arms as the flap approaches its extended position.

2. In combination with a main airfoil, a flap, a forward arm pivoted to the airfoil and to the flap for guiding the latter between retracted position adjacent the airfoil and an extended position spaced beneath the airfoil, and linkage connecting the airfoil and the flap for retaining the latter in substantial parallelism with the airfoil as it approaches said retracted position and for turning it about its transverse axis as it approaches said extended position, said linkage comprising a second arm pivoted at its inner end to the airfoil, a link connecting the outer ends of the two arms, and another link connecting the second arm to the flap, the axes of said links crossing at least in the extended position of said flap.

3. In combination with an airfoil having a flap receiving recess therein, a flap adapted to nest in the recess in the retracted position thereof, a first arm pivoted at its inner end to the airfoil and at its outer end to the flap, a second arm pivoted at its inner end to the airfoil and a link connecting the outer ends of said arms and forming with said arms and said airfoil a four-bar linkage to cause said arms to move in predetermined angular relationship, and a second link pivotally connected at one end to the second arm and at the other end to the flap with the axes of said links crossing at least in the extended position of said flap, said arms and links being arranged to carry the flap in a generally arcuate path between said retracted position and an extended position spaced vertically from the airfoil and spaced longitudinally from said recess, to maintain the flap substantially parallel with the airfoil as it approaches and departs from said retracted position, and to turn the flap about its transverse axis at an accelerating rate with respect to movement thereof in said path as the flap approaches its extended position.

4. In combination with an airfoil, a flap, a forward arm pivoted at one end to the main airfoil and at the other end to the flap for guiding the latter in a generally arcuate path between a retracted position thereof adjacent the airfoil and an extended position wherein its leading edge is displaced vertically and longitudinally from such retracted position, and linkage connecting the airfoil and flap for retaining the latter in substantial parallelism with the airfoil as it approaches said retracted position and for turning it about its longitudinal axis at an accelerating rate as it approaches said extended position, said linkage comprising a second arm pivoted to the airfoil, a link connecting the other ends of the arms, and another link connected at one end to the second arm and at the other end to the flap, the pivotal connection of said last-mentioned link to the flap being disposed rearwardly of the pivotal connection of the forward arm to the flap and forwardly of the pivotal connection of the first-mentioned link to the second arm at least in the retracted position of the flap.

5. In combination with an airfoil, a flap, a linkage connecting the airfoil and the flap for guiding the latter from a retracted position adjacent to said airfoil to an extended position below said airfoil, said linkage comprising a forward arm pivotally connected at one end to the airfoil and at the other end to the flap, a rearward arm pivotally connected at one end to the airfoil, a link connecting the other ends of said arms, and a second link pivotally connected at one end to the rearward arm at a point intermediate the ends thereof and pivotally connected at its other end to the flap rearwardly of the pivotal connection of the forward arm to the flap with the pivotal connection of said second link to the flap being disposed forwardly of the pivotal connection of said first link to said rearward arm at least in the retracted position of said flap, the disposition of the pivot points of the linkage being such that the flap in its travel from retracted to extended position, is maintained approximately parallel to the airfoil until it has reached a position widely spaced from the airfoil and then is turned about its transverse axis at a rate which increases as the flap approaches its fully extended position.

6. In combination with an airfoil, a linkage comprising a first arm and a second arm each pivotally connected at one end to the airfoil at spaced points, a link pivotally connecting the other ends of the arms and a second link pivotally connected at one end to a point on the second arm intermediate the ends thereof, and a flap pivotally connected at spaced points to the other ends of the first arm and the second link, said latter pivotal connections being the only connections between the flap and said linkage and the axes of said links crossing at least in the extended position of said flap.

JOSEPH A. PHILLIPS.

REFERENCES CITED

The following references are of record in the file of this patent:

UNITED STATES PATENTS

| Number | Name | Date |
|---|---|---|
| 2,007,086 | Hall | July 2, 1935 |
| 2,138,753 | Youngman | Nov. 29, 1938 |
| 2,252,656 | Youngman | Aug. 12, 1941 |
| 2,282,647 | Dillon | May 12, 1942 |

FOREIGN PATENTS

| Number | Country | Date |
|---|---|---|
| 519,718 | Great Britain | Apr. 4, 1940 |